United States Patent Office 2,792,354
Patented May 14, 1957

2,792,354

PROCESS FOR BREAKING PETROLEUM EMULSIONS EMPLOYING CERTAIN POLYEPOXIDE-MODIFIED OXYALKYLATION DERIVATIVES OF CERTAIN POLYOLS HAVING AT LEAST THREE HYDROXYLS

Melvin De Groote, University City, and Kwan-Ting Shen, Brentwood, Mo., assignors to Petrolite Corporation, Wilmington, Del., a corporation of Delaware No Drawing. Application September 24, 1953, Serial No. 382,201

3 Claims. (Cl. 252—331)

This invention relates to processes or procedures particularly adapted for preventing, breaking, or resolving emulsions of the water-in-oil type, and particularly petroleum emulsions.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

The present invention is concerned with the resolution of petroleum emulsions of the water-in-oil type characterized by subjecting the emulsion to the action of a demulsifier including synthetic hydrophile products; said synthetic hydrophile products being the reaction product of certain high molal oxyalkylation derivatives, and particularly oxypropylation derivatives, of certain monomeric polyhydric compounds, hereinafter described in detail, and certain non-aryl hydrophile polyepoxides, also hereinafter described in detail.

Particularly is it desirable to use propylene oxide alone rather than in combination with ethylene or butylene oxide, or in combination with both. The obvious reason is that ethylene oxide detracts from water-insolubility, and xylene-solubility and that butylene oxide is more expensive than propylene oxide. Furthermore, since it is desirable to use as little of the polyepoxide as possible due to its cost, it is preferable to use one mole of the polyepoxide for 2 or more moles of the oxyalkylating derivative. This is particularly true when the polyepoxide is a diglycidyl ether.

In essence, the production of the compounds involves the preparation of oxyalkylated derivatives and then reacting the same with the polyepoxide, particularly the diepoxide, of the kind specified.

As to the preparation of the oxyalkylated derivatives and particularly oxypropylated derivatives, see U. S. Patents Nos. 2,552,528, dated May 15, 1951; 2,552,529, dated May 15, 1951; 2,605,232, dated July 29, 1952; and 2,626,910, dated January 27, 1953, all to Melvin De Groote.

Water-soluble polyhydric materials may be subjected to oxyalkylation in the manner described in the four patents, preceding, and particularly oxypropylation. However, if desired, they may be oxyalkylated by use of an alkylene carbonate, such as ethylene carbonate, propylene carbonate or butylene carbonate; or, what is more feasible, from a practical standpoint, is to initially oxyalkylate by means of an alkylene carbonate and then employ an alkylene oxide, particularly propylene oxide. Such procedure employed in connection with compounds of the kind herein employed as raw materials is described in co-pending applications, Serial Nos. 359,661 through and including 359,669, all dated June 4, 1953, to Monson and Dickson of which Serial Nos. 359,666; 359,667; and 359,669 are now abandoned; and 359,665 is now Patent No. 2,766,292 dated October 9, 1956.

Reference is made to U. S. Patent No. 2,499,368, dated March 7, 1950, to De Groote and Keiser. Attention is directed to that part of the text which appears in columns 28 and 29, lines 12 through 75, and lines 1 through 21, respectively. Reference is made to this test with the same force and effect as if it were herein included. This, in essence, means that the preferred product for resolution of petroleum emulsions of the water-in-oil type is characterized by the fact that a 50–50 solution in xylene, or its equivalent, when mixed with one to three volumes of water and shaken will produce an emulsion.

For purpose of convenience, what is said hereinafter will be divided into five parts:

Part 1 is concerned with the hydrophile non-aryl polyepoxides and particularly diepoxides employed as reactants;

Part 2 is concerned with suitable polyols which are reacted with monoepoxides;

Part 3 is concerned with suitable monoepoxides and the oxyalkylation of the polyols by means of said epoxides;

Part 4 is concerned with reactions involving the two previously described types of materials, i. e., the oxyalkylated polyols on the one hand and polyepoxides, and particularly diepoxides, on the other hand;

Part 5 is concerned with the resolution of petroleum emulsions of the water-in-oil type by means of the previously-described chemical compounds or reaction products.

PART 1

Reference is made to previous patents as illustrated in the manufacture of the non-aryl polyepoxides and particularly diepoxides employed as reactants in the instant invention. More specifically, such patents are the following: Italian Patent No. 400,973, dated August 8, 1941; British Patent No. 518,057, dated December 10, 1938; U. S. Patent No. 2,070,990, dated February 16, 1937 to Groll et al.; and U. S. Patent No. 2,581,464, dated January 8, 1952, to Zech. The simplest diepoxide is probably the one derived from 1,3-butadiene or isoprene. Such derivatives are obtained by the use of peroxides or by other suitable means and the diglycidyl ethers may be indicated thus:

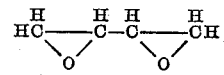

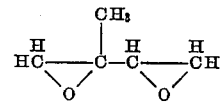

In some instances the compounds are essentially derivatives of etherized epichlorohydrin or methyl epichlorohydrin. Needless to say, such compounds can be derived from glycerol monochlorohydrin by etherization prior to ring closure. An example is illustrated in the previously mentioned Italian Patent No. 400,973:

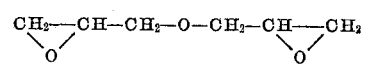

Another type of diepoxide is diisobutenyl dioxide as described in aforementioned U. S. Patent No. 2,070,990, dated February 16, 1937, to Groll, and is of the following formula:

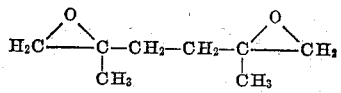

The diepoxides previously described may be indicated by the following formula:

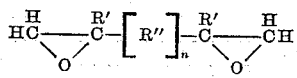

in which R' represents a hydrogen atom or methyl radical and R" represents the divalent radical uniting the two terminal epoxide groups, and $n'$ is the numeral 0 or 1. As previously pointed out, in the case of the butadiene derivative, $n'$ is 0. In the case of diisobutenyl dioxide R" is $CH_2CH_2$ and $n'$ is 1. In another example previously referred to R" is $CH_2OCH_2$ and $n'$ is 1.

However, for practical purposes the only diepoxide available in quantities other than laboratory quantities is a derivative of glycerol or epichlorohydrin. This particular diepoxide is obtained from diglycerol which is largely acyclic diglycerol, and epichlorohydrin or equivalent thereof, in that the epichlorohydrin itself may supply the glycerol or diglycerol radical in addition to the epoxy rings. As has been suggested previously, instead of starting with glycerol or a glycerol derivative, one could start with any one of a number of glycols or polyglycols and it is more convenient to include as part of the terminal oxirane ring radical the oxygen atom that was derived from epichlorohydrin or, as might be the case, methyl epichlorohydrin. So presented the formula becomes:

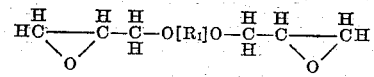

In the above formula $R_1$ is selected from groups such as the following:

$C_2H_4$
$C_2H_4OC_2H_4$
$C_2H_4OC_2H_4OC_2H_4$
$C_3H_6$
$C_3H_6OC_3H_6$
$C_3H_6OC_3H_6OC_3H_6$
$C_4H_8$
$C_4H_8OC_4H_8$
$C_4H_8OC_4H_8OC_4H_8$
$C_3H_5(OH)$
$C_3H_5(OH)OC_3H_5(OH)$
$C_3H_5(OH)OC_3H_5(OH)OC_3H_5(OH)$

It is to be noted that in the above epoxides there is a complete absence of (a) aryl radicals and (b) radicals in which 5 or more carbon atoms are united in a single uninterrupted single group. $R_1$ is inherently hydrophile in character as indicated by the fact that it is specified that the precursory diol or polyol HOROH must be water-soluble in substantially all proportions, i. e., water miscible.

Stated another way, what is said previously means that a polyepoxide such as

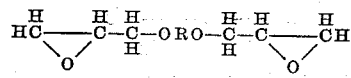

is derived actually or theoretically, or at least derivable, from the diol HOROH, in which the oxygen-linked hydrogen atoms were replaced by

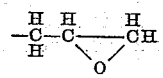

Thus, $R(OH)_n$, where $n$ represents a small whole number which is 2 or more, must be water-soluble. Such limitation excludes polyepoxides if actually derived, or theoretically derived, at least, from water-insoluble diols or water-insoluble diols or water-insoluble triols or higher polyols. Suitable polyols may contain as many as 12 to 20 carbon atoms or thereabouts.

Referring to a compound of the type above in the formula

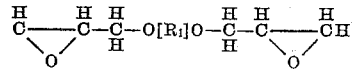

in which $R_1$ is $C_3H_5(OH)$, it is obvious that reaction with another mole of epichlorohydrin with appropriate ring closure would produce a triepoxide or, similarly, if R happened to be $C_3H_5(OH)OC_3H_5(OH)$, one could obtain a tetraepoxide. Actually, such procedure generally yields triepoxides, or mixtures with higher epoxides and perhaps in other instances mixtures in which diepoxides are also present. Our preference is to use the diepoxides.

There is available commercially at least one diglycidyl ether free from aryl groups and also free from any radical having 5 or more carbon atoms in an uninterrupted chain. This particular diglycidyl ether is obtained by the use of epichlorohydrin in such a manner that approximately 4 moles of epichlorohydrin yield one mole of the diglycidyl ether, or, stated another way, it can be considered as being formed from one mole of diglycerol and 2 moles of epichlorohydrin so as to give the appropriate diepoxide. The molecular weight is approximately 370 and the number of epoxide groups per molecule are approximately 2. For this reason in the first of a series of subsequent examples this particular diglycidyl ether is used, although obviously any of the others previously described would be just as suitable. For convenience, this diepoxide will be referred to as diglycidyl ether A. Such material corresponds in a general way to the previous formula.

Using laboratory procedure we have reacted diethyleneglycol with epichlorohydrin and subsequently with alkali so as to produce a product which, on examination, corresponded approximately to the following compound:

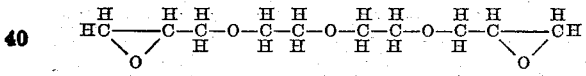

The molecular weight of the product was assumed to be 230 and the product was available in laboratory quantities only. For this reason, the subsequent table referring to the use of this particular diepoxide, which will be referred to as diglycidyl ether B, is in grams instead of pounds.

Probably the simplest terminology for these polyepoxides, and particularly diepoxides, to differentiate from comparable aryl compounds, is to use the terminology "epoxyalkanes" and, more particularly, polyepoxyalkanes or diepoxyalkanes. The difficulty is that the majority of these compounds represent types in which a carbon atom chain is interrupted by an oxygen atom and, thus, they are not strictly alkane derivatives. Furthermore, they may be hydroxylated or represent a heterocyclic ring. The principal class properly may be referred to as polyepoxypolyglycerols, or diepoxypolyglycerols.

Other examples of diepoxides involving a heterocyclic ring having, for example, 3 carbon atoms and 2 oxygen atoms, are obtainable by the conventional reaction of combining erythritol with a carbonyl compound, such as formaldehyde or acetone so as to form the 5-membered ring, followed by conversion of the terminal hydroxyl groups into epoxy radicals.

See Canadian Patent No. 672,935.

PART 2

As to suitable polyols reference is made to the description of water-soluble polyols having at least 4 hydroxyls as appears in U. S. Patent No. 2,552,528, dated May 15, 1951, to De Groote. Subsequent description will appear in regard to polyols having 3 hydroxyl groups. Said description is found in said patent beginning with column 2, line 39, through and including column 15, line 37.

As has been pointed out previously, for the purpose of the present invention the polyols need not have 4 hydroxyl radicals but may have as many as 3. The most common trihydric polyol is glycerol. Other suitable trihydric polyols include trimethylolethane. Additional trihydric polyols may be obtained from monohydric alcohols by reaction with 2 moles of glycide or methylglycide. Similarly, they may be obtained from dihydric alcohols, i. e., diols such as ethylene, propylene or butylene glycol by reaction with one mole of glycide or methylglycide. Polyols can be obtained from polyhydric alcohols having 4 hydroxyls by an etherization step so as to eliminate one hydroxyl radical. For instance, acyclic diglycerol can be reacted with a methylating agent so as to produce the monomethyl ether. Likewise, sorbitan can be treated in a similar manner.

In regard to suitable ethers also having more than 3 hydroxyl radicals, reference is made to methylglucoside which is available in the open market.

More specifically, as to suitable examples, particularly those having 4 or more hydroxyl groups, reference is made to U. S. Patent No. 2,450,079, dated September 28, 1948, to Brown, which, in turn, is referred to in aforementioned U. S. Patent No. 2,552,528. Said U. S. patent in defining a polyol which is perfectly acceptable for the instant purpose, states as follows:

"Polyols which may be used are those of relatively low carbon content which contain at least 3 hydroxyl groups. By the term polyols, as used in this specification, are meant polyhydric alcohols and carbohydrates. Since the use of polyols of high carbon content per molecule tends to result in end products which are not sufficiently waxy and plastic, it is preferred to use polyols having not more than 12 carbon atoms per molecule. As exemplary of polyols which may be employed may be listed glycerol and the higher polyhydric alcohols, the cyclitols such as inositols, and partially alkylated cyclitols such as quebrachitol and pinitol, diglycerol and the lower polyglycerols, pentaerythritol, di-pentaerythritol and other pentaerythritol ethers, hexitane, such as sorbitan and mannitan, saccharides such as glucose, fructose, lower alkyl glucosides, sucrose, lactose, trehalose, glucosan, and mannosan, and lactones such as gluconiclactone. Polyols containing up to 6 carbon atoms in particular have yielded valuable products. Examples of such are glycerol, mannitan, hexitols, such as sorbitol, mannitol, commercial sorbitol syrup, and hexoses, such as glucose. Mixture of polyols, such as partially reduced sugars, also may be employed."

PART 3

The nonhydroxylated monoepoxides employed for reaction with the polyols are monoepoxides free from a hydroxyl radical and having not over 4 carbon atoms, to wit, ethylene oxide, propylene oxide, and butylene oxide. Since the purpose is to obtain a water-insoluble product in the initial stage as well as a product which is xylene-soluble, it is obvious the amount of ethylene oxide which can be used is comparatively small. It may be used, for example, to convert a polyol which is not too water-soluble, such as dipentaerythritol, into a more water-soluble form. The oxide which is most satisfactory, both from the standpoint of reactivity and cost is propylene oxide. Butylene oxide, or rather any of the butylene oxide is almost twice the cost of propylene oxide and it is obvious there is no advantage in using butylene oxide except in special circumstances and perhaps to permit the incidental use of a greater amount of ethylene oxide. For instance, subsequent reference is made to products as described in the four aforementioned U. S. Patents Nos. 2,552,528, 2,552,529, 2,605,232 and 2,626,910.

The solubility effect introduced by oxybutylation depends in part whether it is the 12 oxide or the 2,3 oxide. In most cases 4 moles of butylene oxide can be replaced by one mole of ethylene oxide and 3 moles of butylene oxide. In some circumstances 3 of propylene oxide may be replaced by 2 moles of butylene oxide and one of ethylene oxide. If desired, one could use a mixture of propylene oxide and ethylene oxide in which the ethylene oxide represented just a few percent by weight. Mixtures of butylene oxide and propylene oxide can be used either alone or in conjunction with ethylene oxide. However, for sake of brevity it is believed the subsequent text can be limited to oxypropylation for reasons pointed out and because the variants above indicated are obvious.

As to the production of oxypropylated derivatives, reference is made to Part 2 of U. S. Patent No. 2,552,528 beginning at column 15, line 39, and ending at column 21, line 72; also to Part 2 of U. S. Patent 2,552,529 beginning at column 13, line 27, and ending at column 21, line 46; to U. S. Patent No. 2,605,232, column 4, Part 4, line 51, and ending at column 11, line 37; and to U. S. Patent No. 2,626,910, Part 1, column 2, line 2, and ending at column 8, line 42.

The objection to the use of hydroxylated monoepoxides, such as glycide or methylglycide, is primarily the cost and, secondly, the fact that they introduce water-soluble characteristics comparable to ethylene oxide. This does not mean that if desired one could not introduce the use of glycide or methylglycide in the procedure which involves reaction with a monoepoxide or at the end of the procedure. In fact, in some instances it is desired to use one or more moles of glycide at some stage per initial hydroxyl group in order to give a branch chain during subsequent reaction with butylene oxide or the like. It is obvious, also, that if desired one could introduce the use of a glycol ether, such as glycidylisopropyl ether, glycidylphenyl ether, etc. Such variants except giving a branched chain effect, add little or nothing to the general structure and require no further elaboration.

PART 4

As stated previously, the final reaction involves an oxyalkylated polyol, particularly an oxypropylated polyol of the kind described, and a polyepoxide. A polyepoxide is most conveniently a diglycidyl ether and since the diglycidyl ether is the more expensive reactant we have preferred to use 2 moles of the oxyalkylated polyol and one mole of the polyglycidyl ether so as to obtain a larger molecule which has a different effect in various uses where surface activity is involved. Needless to say, if the oxyalkylated polyol is designated as (A) and the diglycidyl ether as (B), the resultant larger molecule may be indicated as (ABA). If another mole of the diglycidyl ether is employed then these two larger molecules could be tied together so as to give a molecule approximately 4 times the size of the initial molecule which could be indicated as (ABABABA). It is evident this would just be a continuation by further use of the reactant and all that is necessary is to avoid cross-linking, gelation or formation of an insoluble material. This generally presents no difficulty and if such difficulty arises it can be avoided by use of a larger amount of solvent, or by the use of a lower temperature of reaction, or by use of an oxyalkylated polyol having a longer chain length between hydroxyl groups.

For reasons of brevity what is said hereinafter will be concerned largely with the reaction involving 2 moles of the oxyalkylated polyol and one mole of the diglycidyl ether, as specified. The reaction is essentially an oxyalkylation reaction and thus may be considered as merely a continuance of the previous oxyalkylation reaction. The previous oxyalkylation reaction involved a monoepoxide as differentiated from a polyepoxide and particularly a diepoxide. The reactions take place in substantially the same way, i. e., by the opportunity to react at somewhere above the boiling point of water and below the point of decomposition, for example, 130–185° C.

in the presence of a small amount of alkaline catalyst. Since the polyepoxide is non-volatile as compared, for example, with ethylene oxide, the reaction is comparatively simple. Purely from a mechanical standpoint it is a matter of convenience to conduct both classes of reactions in the same equipment. In other words, after the polyol has been reacted with propylene oxide or the like, it is subsequently reacted with a polyepoxide. The polyepoxide reaction can be conducted in an ordinary reaction vessel such as the usual glass laboratory equipment. This is particularly true of the kind used for resin manufacture as described in a number of patents, as for example, U. S. Patent No. 2,499,365. One can use a variety of catalysts in connection with the polyepoxide of the same class employed with monoepoxide. In fact, the reaction will go at an extremely slow rate without any catalyst at all. The usual catalysts include alkaline materials such as caustic soda, caustic potash, sodium methylate, etc. Other catalysts may be acidic in nature and are of the kind characterized by iron and tin chlorides. Furthermore, insoluble catalysts such as clays or specially prepared mineral catalysts have been used. For practical purposes, it is best to use the same catalyst as is used in the initial oxyalkylation step and in many cases there is sufficient residual catalyst to serve for the reaction involving the second oxyalkylation step, i. e., the polyepoxide. For this reason, we have preferred to use a small amount of finely divided caustic soda or sodium methylate as the initial catalyst and also the catalyst in the second stage. The amount generally employed is 1%, 2%, or 3%, of these alkaline catalysts.

Actually, the reactions of polyepoxides with various resins have been thoroughly described in the literature and the procedure is, for all practical purposes, the same as with glycide which has been described in one or more of the previously mentioned U. S. Patents Nos. 2,552,528, 2,552,529, 2,605,232 and 2,626,910. Of course, in the instant process one is not involved with a resin but with an oxyalkylated polyol but the reactions are essentially the same since the point of reactivity is a labile hydrogen atom.

It goes without saying that the reaction involving the polyepoxide can be conducted in the same manner as the monoepoxide as far as the presence of an inert solvent is concerned, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The solvent so selected should be one which, of course, is suitable in the oxyalkylation step involving the monoepoxides described subsequently. The solvent selected may depend on the ability to remove it by subsequent distillation if required. Here again it has been our preference to have a solvent present in the oxyalkylation involving the initial stage and permitting the solvent to remain. The amount of solvent may be insignificant, depending whether or not exhaustive oxyalkylation is employed. However, since the oxyalkylated polyols are almost invariably liquids there is no need for the presence of a solvent as when oxyalkylation involves a solid which may be rather high melting. Thus, it is immaterial whether there is a solvent present or not and it is immaterial whether solvent was added in the first stage of oxyalkylation or not, and also it is immaterial whether there was solvent present in the second stage or oxyalkylation or not. The advantage of the presence of solvent is that sometimes it is a convenient way of controlling the reaction temperature and thus in the subsequent examples we have added sufficient xylene so as to produce a mixture which boils somewhere in the neighborhood of 125° C. to 140° C. and removes xylene so as to bring the boiling point of the mixture to about 140° C. during part of the reaction and subsequently removing more xylene so that the mixture refluxed at somewhere between 170° C to 190° C. This was purely a convenience and need not be employed unless desired.

*Example A1*

The oxyalkylated polyol employed was the one identified as Example 2 in aforementioned U. S. Patent No. 2,552,528. The oxyalkylated derivative had a molecular weight of approximately 1300. The amount used was approximately 130 grams. It was obtained in turn by the oxypropylation of pentaerythritol. The number of hydroxyls in the original polyol was, of course, 4.

130 grams of oxypropylated pentaerythritol were mixed with approximately an equal weight of xylene or, more exactly, 148 grams. Sufficient powdered sodium methylate was added to equal 1.5 grams. The mixture was stirred and the temperature rose to 150° C. and 18.5 grams of diepoxide A, previously described, were added over approximately a 45 minute period. The mixture was allowed to react for a total period of about 3 hours at the maximum temperature or slightly below. At the end of this time the reaction was stopped and the product represented a dark viscous mass.

For reasons pointed out description of further examples will be limited to a tabular presentation which appears in following Tables I, II, III and IV.

TABLE I

| Ex. No. | O. S. C.[1] of— | | Mol. wt. (theo.) | Amt. used, grams | Polyol from which OSC is derived | No. of Hydroxyls in Original Polyol |
|---|---|---|---|---|---|---|
| | Ex. No. | U. S. Patent No. | | | | |
| A1 | 2 | 2,552,528 | 1,296 | 129.6 | Pentaerythritol | 4 |
| A2 | 3 | 2,552,528 | 1,414 | 141.4 | Dipentaerythritol | 6 |
| A3 | 4 | 2,552,528 | 1,532 | 153.2 | Tri-pentaerythritol | 8 |
| A4 | 28 | 2,552,528 | 4,850 | 485.0 | Monoglycerol ether of pentaerythritol | 5 |
| A5 | 29 | 2,552,528 | 4,968 | 496.8 | Monoglycerol ether of di-pentaerythritol | 7 |
| A6 | 30 | 2,552,528 | 5,088 | 508.8 | Monoglycerol ether of tri-pentaerythritol | 9 |
| A7 | 54 | 2,552,528 | 7,140 | 714.0 | Monoethyleneglycol ether of pentaerythritol | 4 |
| A8 | J | 2,552,529 | 1,464 | 146.4 | Sorbitol | 6 |
| A9 | M | 2,552,529 | 3,500 | 350.0 | do | 6 |
| A10 | 5 | 2,552,529 | 1,416 | 141.6 | Monoglycerol ether of sorbitol | 7 |
| A11 | 10 | 2,552,529 | 1,490 | 149.0 | Diglycerol ether of mannitol | 8 |
| A12 | 13 | 2,552,529 | 1,606 | 160.6 | Hexaethyleneglycol ether of sorbitol | 6 |
| A13 | 47 | 2,552,529 | 10,056 | 100.6 | Monoglycerol ether of sorbitol | 7 |
| A14 | 52 | 2,552,529 | 10,130 | 101.3 | Diglycerol ether of mannitol | 8 |
| A15 | 55 | 2,552,529 | 10,246 | 102.5 | Hexaethyleneglycol ether of sorbitol | 6 |
| A16 | 2a | 2,626,910 | 3,110 | 311.0 | Dextrose | 5 |
| A17 | 4a | 2,626,910 | 6,320 | 632.0 | do | 5 |
| A18 | 4a | 2,505,232 | 4,485 | 448.5 | Diglycerol | 4 |
| A19 | 8a | 2,505,232 | 10,900 | 109.0 | do | 4 |
| A20 | 9a | 2,505,232 | 1,778 | 177.8 | do | 4 |

[1] O. S. C. means oxyalkylation-susceptible compound.

TABLE II

| Ex. No. | Diepoxide used | Amt., gms. | Catalyst (NaOCH$_3$), gms. | Xylene, gms. | Molar ratio | Time of reaction, hrs. | Max. temp., °C. | Color and physical state |
|---|---|---|---|---|---|---|---|---|
| A1 | A | 18.5 | 1.5 | 148 | 2:1 | 3 | 150 | Dark viscous mass. |
| A2 | A | 18.5 | 1.6 | 160 | 2:1 | 3 | 154 | Do. |
| A3 | A | 18.5 | 1.7 | 172 | 2:1 | 3 | 165 | Do. |
| A4 | A | 18.5 | 5.0 | 504 | 2:1 | 3 | 158 | Do. |
| A5 | A | 18.5 | 5.1 | 515 | 2:1 | 3 | 160 | Do. |
| A6 | A | 18.5 | 5.2 | 527 | 2:1 | 3 | 166 | Do. |
| A7 | A | 18.5 | 7.3 | 733 | 2:1 | 3 | 165 | Do. |
| A8 | A | 18.5 | 1.6 | 165 | 2:1 | 3 | 158 | Do. |
| A9 | A | 18.5 | 3.7 | 169 | 2:1 | 3 | 160 | Do. |
| A10 | A | 18.5 | 1.6 | 160 | 2:1 | 3 | 160 | Do. |
| A11 | A | 18.5 | 1.6 | 168 | 2:1 | 3 | 148 | Do. |
| A12 | A | 18.5 | 1.8 | 179 | 2:1 | 3 | 156 | Do. |
| A13 | A | 1.9 | 1.2 | 103 | 2:1 | 3 | 160 | Do. |
| A14 | A | 1.9 | 1.2 | 103 | 2:1 | 3 | 155 | Do. |
| A15 | A | 1.9 | 1.2 | 104 | 2:1 | 3 | 158 | Do. |
| A16 | A | 18.5 | 3.3 | 330 | 2:1 | 3 | 155 | Do. |
| A17 | A | 18.5 | 6.5 | 650 | 2:1 | 3 | 164 | Do. |
| A18 | A | 18.5 | 4.6 | 467 | 2:1 | 3 | 160 | Do. |
| A19 | A | 1.9 | 1.2 | 111 | 2:1 | 3 | 162 | Do. |
| A20 | A | 18.5 | 1.9 | 196 | 2:1 | 3 | 160 | Do. |

TABLE III

| Ex. No. | O. S. C.[1] of— Ex. No. | O. S. C.[1] of— U. S. Patent No. | Mol. wt. (theo.) | Amt. used, grams | Polyol from which OSC is derived | No. of Hydroxyls in Original Polyol |
|---|---|---|---|---|---|---|
| B1 | 2 | 2,552,528 | 1,296 | 129.6 | Pentaerythritol | 4 |
| B2 | 3 | 2,552,528 | 1,414 | 141.4 | Dipentaerythritol | 6 |
| B3 | 4 | 2,552,528 | 1,532 | 153.2 | Tri-pentaerythritol | 8 |
| B4 | 28 | 2,552,528 | 4,850 | 485.0 | Monoglycerol ether of pentaerythritol | 5 |
| B5 | 29 | 2,552,528 | 4,968 | 496.8 | Monoglycerol ether of di-pentaerythritol | 7 |
| B6 | 30 | 2,552,528 | 5,088 | 508.8 | Monoglycerol ether of tri-pentaerythritol | 9 |
| B7 | 54 | 2,552,528 | 7,140 | 714.0 | Monoethyleneglycol ether of pentaerythritol | 4 |
| B8 | J | 2,552,529 | 1,464 | 146.4 | Sorbitol | 6 |
| B9 | M | 2,552,529 | 3,500 | 350.0 | do | 6 |
| B10 | 5 | 2,552,529 | 1,416 | 141.6 | Monoglycerol ether of sorbitol | 7 |
| B11 | 10 | 2,552,529 | 1,490 | 149.0 | Diglycerol ether of mannitol | 8 |
| B12 | 13 | 2,552,529 | 1,606 | 160.6 | Hexaethyleneglycol ether of sorbitol | 6 |
| B13 | 47 | 2,552,529 | 10,056 | 100.6 | Monoglycerol ether of sorbitol | 7 |
| B14 | 52 | 2,552,529 | 10,130 | 101.3 | Diglycerol ether of mannitol | 8 |
| B15 | 55 | 2,552,529 | 10,246 | 102.5 | Hexaethyleneglycol ether of sorbitol | 6 |
| B16 | 2a | 2,626,910 | 3,110 | 311.0 | Dextrose | 5 |
| B17 | 4a | 2,626,910 | 6,320 | 632.0 | do | 5 |
| B18 | 4a | 2,505,232 | 4,485 | 448.5 | Diglycerol | 4 |
| B19 | 8a | 2,505,232 | 10,900 | 109.0 | do | 4 |
| B20 | 9a | 2,505,232 | 1,778 | 177.8 | do | 4 |

[1] O. S. C. means oxyalkylation-susceptible compound.

TABLE IV

| Ex. No. | Diepoxide used | Amt., gms. | Catalyst (NaOCH$_3$), gms. | Xylene, gms. | Molar ratio | Time of reaction, hrs. | Max. temp., °C. | Color and physical state |
|---|---|---|---|---|---|---|---|---|
| B1 | B | 11 | 1.4 | 141 | 2:1 | 3 | 160 | Dark viscous mass. |
| B2 | B | 11 | 1.5 | 152 | 2:1 | 3 | 155 | Do. |
| B3 | B | 11 | 1.6 | 164 | 2:1 | 3 | 150 | Do. |
| B4 | B | 11 | 5.0 | 496 | 2:5 | 3 | 152 | Do. |
| B5 | B | 11 | 5.1 | 507 | 2:5 | 3 | 158 | Do. |
| B6 | B | 11 | 5.2 | 520 | 2:5 | 3 | 154 | Do. |
| B7 | B | 11 | 7.3 | 725 | 2:5 | 3 | 154 | Do. |
| B8 | B | 11 | 1.6 | 157 | 2:1 | 3 | 155 | Do. |
| B9 | B | 11 | 3.6 | 361 | 2:1 | 3 | 150 | Do. |
| B10 | B | 11 | 1.5 | 153 | 2:1 | 3 | 153 | Do. |
| B11 | B | 11 | 1.6 | 160 | 2:1 | 3 | 153 | Do. |
| B12 | B | 11 | 1.7 | 172 | 2:1 | 3 | 150 | Do. |
| B13 | B | 1.1 | 1.0 | 102 | 2:1 | 3 | 148 | Do. |
| B14 | B | 1.1 | 1.0 | 102 | 2:1 | 3 | 150 | Do. |
| B15 | B | 1.1 | 1.0 | 104 | 2:1 | 3 | 150 | Do. |
| B16 | B | 11 | 3.2 | 322 | 2:1 | 3 | 149 | Do. |
| B17 | B | 11 | 6.4 | 643 | 2:1 | 3 | 150 | Do. |
| B18 | B | 11 | 4.6 | 460 | 2:1 | 3 | 152 | Do. |
| B19 | B | 1.1 | 1.1 | 110 | 2:1 | 3 | 150 | Do. |
| B20 | B | 11 | 1.9 | 189 | 2:1 | 3 | 150 | Do. |

PART 5

As to the use of conventional demulsifying agents reference is made to U. S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example A7, herein described.

Having thus described our invention, what we claim as new and desire to secure by Letters Patent is:

1. A process for breaking petroleum emulsions of the water-in-oil type characterized by subjecting the emulsion to the action of a demulsifier including hydrophile synthetic products; said hydrophile synthetic products being the reaction product of (A) high molal oxyalkylation derivatives of monomeric polyhydric compounds, with the proviso that (a) the initial polyhydric reactant be free from any radical having at least 8 uninterrupted carbon atoms; (b) the initial polyhydric reactant have a molecular weight not over 1200 and at least 3 hydroxyl radicals; (c) the initial polyhydric reactant be water-soluble and xylene-insoluble; (d) the oxyalkylation end-product be water-insoluble and xylene-soluble; (e) the oxyalkylation end-product be within the molecular weight range of 2000 to 30,000 on an average statistical basis; (f) the solubility characteristics of the oxyalkylation end-product in respect to water and xylene be substantially the result of the oxyalkylation step; (g) the ratio of alkylene oxide per hydroxyl in the initial polyhydric reactant be within the range of 7 to 70; (h) the initial polyhydric reactant represent not more than 12½% by weight of the oxyalkylation end-product on a statistical basis; (i) the preceding provisos being based on complete reaction involving a nonhydroxylated alpha-beta alkylene oxide having not over 4 carbon atoms, and the initial polyhydric reactant; and (B) a non-aryl hydrophile polyepoxide characterized by the fact that the precursory polyhydric alcohol, in which an oxygen-linked hydrogen atom is replaced subsequently by the radical

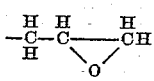

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; with the proviso that said reactive compounds (A) and (B) be members of the class consisting of non-thermosetting organic solvent-soluble liquids and low-melting solids; with the final proviso that the reaction product be a member of the class of liquids and solvent-soluble solids; said reaction between (A) and (B) being conducted below the pyrolytic point of the reactants and the resultants of reaction.

2. A process for breaking petroleum emulsions of the water-in-oil type characterized by subjecting the emulsion to the action of a demulsifier including hydrophile synthetic products; said hydrophile synthetic products being the reaction product of (A) high molal oxypropylation derivatives of monomeric polyhydric compounds with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end-product be water-insoluble and xylene-soluble; (e) the oxypropylation end-product be within the molecular weight range of 2000 to 30,000 on an average statistical basis; (f) the solubility characteristics of the oxypropylation end-product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end-product on a statistical basis; (i) the preceding provisos being based on complete reaction involving the propylene oxide and the initial polyhydric reactant; and (B) a non-aryl hydrophile polyepoxide characterized by the fact that the precursory polyhydric alcohol, in which an oxygen-linked hydrogen atom is replaced subsequently by the radical

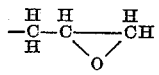

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; with the proviso that the ratio of reactant (A) to reactant (B) be in the proportion of 2 moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of liquids and solvent-soluble solids; said reaction between (A) and (B) being conducted below the pyrolytic point of the reactants and the resultants of reaction.

3. A process for breaking petroleum emulsions of the water-in-oil type characterized by subjecting the emulsion to the action of a demulsifier including hydrophile synthetic products; said hydrophile synthetic products being the reaction product of (A) high molal oxypropylation derivatives of monomeric polyhydric compounds with the proviso that (a) the initial polyhydric reactants be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end-product be water-insoluble and xylene-soluble; (e) the oxypropylation end-product be within the molecular weight range of 2000 to 30,000 on an average statistical basis; (f) the solubility characteristics of the oxypropylation end-product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end-prdouct on a statistical basis; (i) the preceding provisos being based on complete reaction involving the propylene oxide and the initial polyhydric reactant; and (B) a hydroxylated diepoxy polyglycerol having not over 20 carbon atoms; with the proviso that the ratio of reactant (A) to reactant (B) be in the proportion of 2 moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of liquids and solvent-soluble solids; said reaction between (A) and (B) being conducted below the pyrolytic point of the reactants and the resultants of reaction.

(References on following page)

References Cited in the file of this patent

UNITED STATES PATENTS

| | | | |
|---|---|---|---|
| 2,233,383 | De Groote et al. | Feb. 25, | 1941 |
| 2,281,419 | De Groote et al. | Apr. 28, | 1942 |
| 2,317,726 | Boedeker et al. | Apr. 27, | 1943 |
| 2,527,970 | Sokol | Oct. 31, | 1950 |
| 2,552,532 | De Groote | May 15, | 1951 |
| 2,552,533 | De Groote | May 15, | 1951 |
| 2,615,853 | Kirkpatrick et al. | Oct. 28, | 1952 |
| 2,617,830 | Kosmin | Nov. 11, | 1952 |
| 2,624,766 | Butler | Jan. 6, | 1953 |